United States Patent
Warwick

[15] 3,642,119
[45] Feb. 15, 1972

[54] VACUUM CONVEYOR BEAM

[72] Inventor: Charles Herbert Warwick, Vancouver, Wash.

[73] Assignee: Fibreboard Corporation, San Francisco, Calif.

[22] Filed: Aug. 12, 1970

[21] Appl. No.: 63,064

[52] U.S. Cl. ............................................. 198/184, 198/202
[51] Int. Cl. ......................................................... B65g 15/00
[58] Field of Search ..................... 198/184, 202, 195; 271/74, 271/26 ES, 32

[56] References Cited

UNITED STATES PATENTS

| | | | |
|---|---|---|---|
| 2,895,552 | 7/1959 | Pomper et al. | 271/74 X |
| 2,747,725 | 5/1956 | Hatch et al. | 198/195 |
| 1,692,832 | 11/1928 | Harrison | 198/202 |

*Primary Examiner*—Richard E. Aegerter
*Assistant Examiner*—H. S. Lane
*Attorney*—Kolisch & Hartwell

[57] ABSTRACT

A conveyor beam including an endless, vacuum conveyor belt supported at its ends by drive pulleys and in the center by a vacuum manifold. Perforations in the belt register with an elongate slot in the manifold, in line with the direction of belt movement, to grasp and retain objects on the belt. Guide pins are secured on the inner surface of the belt, interspersed with the perforations, adapted to project into the slot and slide therealong to maintain the moving belt in alignment. The upper surface of the manifold and the edges of the slot are lined with a material having a low coefficient of friction, such as graphite impregnated nylon.

4 Claims, 5 Drawing Figures

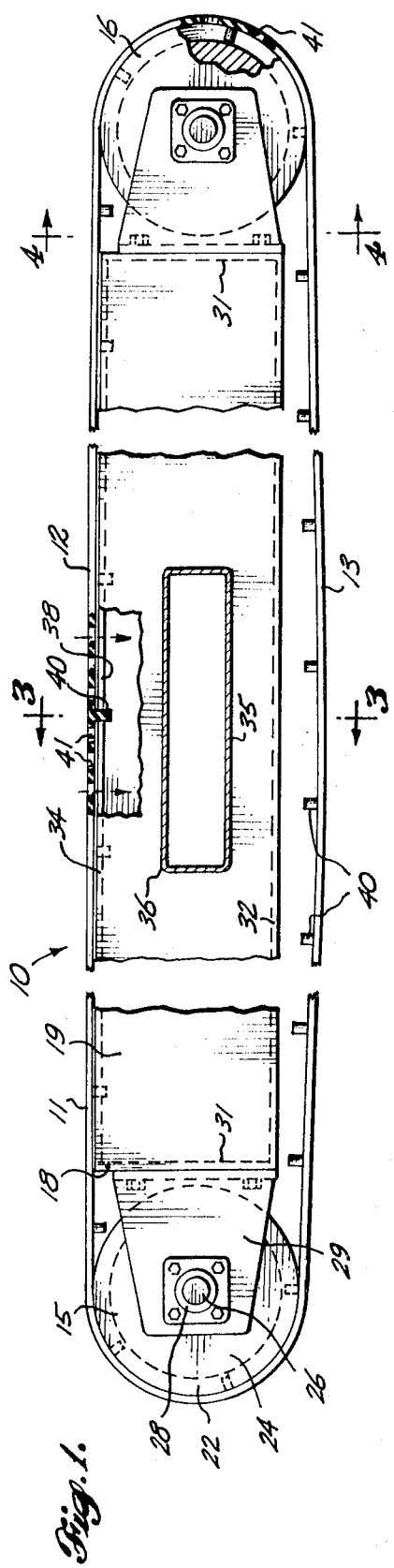
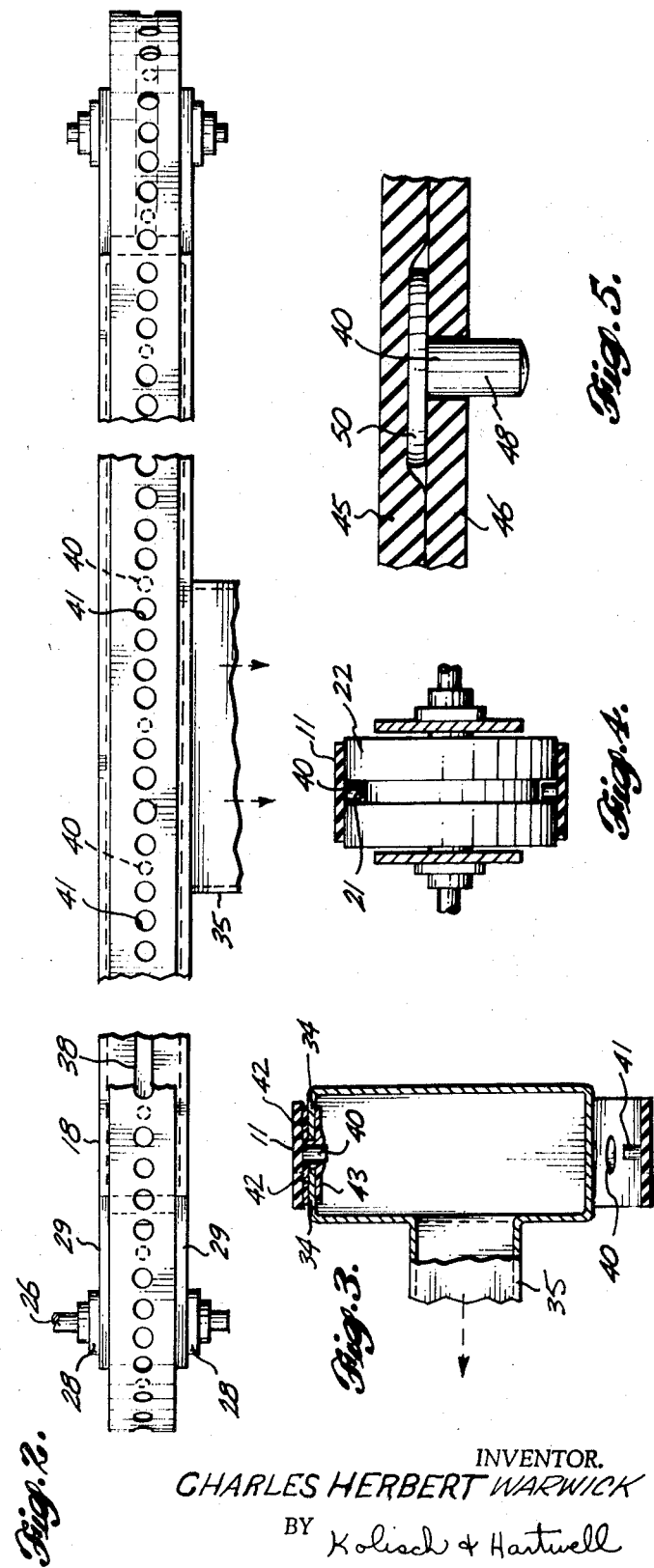

3,642,119

VACUUM CONVEYOR BEAM

BACKGROUND OF THE INVENTION

The present invention concerns a conveyor beam including an endless vacuum conveyor belt adapted to support and convey objects such as plywood panels. More particularly, the invention concerns an endless conveyor belt including means for maintaining the belt in alignment even in the presence of side thrusts or lateral forces upon the workpiece being transported.

The use of vacuum conveyor belts for various purposes is well-known in the art. Thus, the usual vacuum conveyor belt includes some means for applying vacuum pressure through perforations in the belt to grasp and retain objects thereon. Such belts are widely used to transport objects along predetermined paths and to facilitate the performance of certain woodworking or machining operations upon the workpiece during transportation. For example, in the lumber industry, it is convenient to use endless conveyor belts to transport panels of lumber for loading and stacking purposes. Furthermore, it is often convenient to use endless conveyor belts in grooving, finishing and/or surfacing operations of the lumber panels.

In performing such steps, it is necessary to maintain the panels in alignment on the conveyor belt. For example, in performing a grooving operation on a plywood panel, it is absolutely necessary to maintain the panel in proper registration with the tools of the grooving apparatus. Otherwise the grooves will not be true and the panel will be ruined. Since the edges of an unfinished panel may be slightly uneven, it is not practical to utilize guide means at the edge of the panel for maintaining the desired alignment during movement by the conveyor.

Furthermore, the use of guide means at the edge of the panel is not practical since the operations performed on the panel may include side thrusts or forces upon the surface of the workpiece. Such side thrusts can occur in grooving operations, but more often occur in sanding and planing operations.

SUMMARY OF THE INVENTION

Accordingly, it is an object of the invention to provide an improved vacuum conveyor belt including means for maintaining the belt and workpiece carried thereby in alignment along a prescribed path of movement. It is another object of the invention to provide an endless conveyor belt having guide pins secured on the inner surface of the belt adapted to project into and slide along a reference slot to maintain the moving belt in alignment with a path of movement.

It is a further object of the invention to provide, in conjunction with a vacuum conveyor belt, a vacuum manifold having an upper surface which includes an elongate slot adapted to exert vacuum pressure upon workpieces located on the belt, and to function as a guide slot for guide pins secured to the conveyor belt.

It is yet another object of the invention to provide such a vacuum manifold wherein the upper surface of the manifold and the edges of the guide slot are surfaced with a material having a low coefficient of friction, such as nylon.

These and other objects of the invention are attained by a flat, endless vacuum conveyor belt supported at its ends by circular pulleys. One of the pulleys is adapted to be rotated by a suitable power source for driving the conveyor belt in conventional fashion, and the other pulley serves as an idler. An elongate vacuum manifold of generally rectangular outline is provided between the pulleys, adapted to partially support the upper reach of the belt. An elongate slot is formed in the manifold, aligned along the intended path of belt movement. The upper surface of the manifold and the edges of the slot are surfaced with a material having a low coefficient of friction, such as nylon impregnated with graphite. A line of perforations is provided in the belt, adapted to register with the slot in the vacuum manifold as the belt moves over the manifold. Guide pins are secured on the inner surface of the belt in line with, and interspersed with the perforations. The guide pins are adapted to project into the slot in the manifold and slide therealong when the belt is moving. When an object is placed on the belt covering the perforations, vacuum pressure is exerted on the object to grasp it and retain it in position on the belt. The guide pins prevent side movement of the belt even if side thrusts or lateral forces are exerted upon the object being transported.

BRIEF DESCRIPTION OF THE DRAWINGS

These and other objects of the invention will become apparent from the following detailed description of the invention, taken in conjunction with the accompanying drawings, wherein:

FIG. 1 is a right elevation view of a vacuum conveyor beam designed in accordance with the invention;

FIG. 2 is a plan view of the conveyor beam shown in FIG. 1;

FIG. 3 is a vertical sectional view taken along lines 3—3 in FIG. 1;

FIG. 4 is a vertical sectional view taken along lines 4—4 in FIG. 1; and

FIG. 5 is an enlarged view, in section, of the conveyor belt.

DETAILED DESCRIPTION OF THE INVENTION

Referring now to the drawings, a preferred embodiment of the invention is illustrated and described. A vacuum conveyor beam generally indicated at 10 includes an endless belt 11 having an upper reach 12 and a lower reach 13 that extend between a circular drive pulley 15 and a circular idler pulley 16. The pulleys 15, 16 are generally supported at the ends of an elongate framework 18 which also confines a vacuum manifold generally indicated at 19. The vacuum manifold occupies nearly the full span between pulleys 15, 16 and includes an upper plate 34 that serves to partially support upper reach 12 of the conveyor belt.

Pulleys 15 and 16 are of identical design, each including a belt supporting outer flange 22 and an inner hub joined by a wall 24. The hub includes an inner race that surrounds and is fixed to a shaft 26. As shown, shaft 26 is rotatably supported between extended, opposed flange members 29 at the ends of framework 18 by means of bearings 28. Shaft 26 of pulley 15 is adapted to be rotated in a conventional manner, by drive means not shown, for driving the belt in the direction indicated by the arrow. Pulley 16 serves as an idler pulley.

As best seen in Fig. 4, the center of flange 22 of the pulley is formed with a groove 21 about its periphery to receive pins secured to the inner surface of the belt for a purpose to be described.

The vacuum manifold 19 is formed of the sidewalls of framework 18, a pair of opposed end walls 31, a bottom plate 32 and a top plate 34. An inlet duct 35 communicates with a generally rectangular opening 36 in one of the sides of the framework. Duct 35 is adapted to be connected at its other end, not shown, to a compressor or other conventional apparatus for exhausting the interior of the manifold.

Top plate 34 is generally divided along its length by a narrow opening, or slot 38 which extends the full length of the manifold. The opposed edges of slot 38 are accurately finished and comprise a pair of reference surfaces which determine the line of movement of the belt. Slot 38 is of sufficient width to accommodate pins 40 secured to the inner surface of the belt. Sufficient tolerance is provided between the width of the slot and the size of the pins to permit the pins to slide freely within the slot. However, the pins fit tightly enough in the slot that no objectionable lateral translation of the belt is permitted. End walls 31 of the manifold are notched, in line with slot 38, to permit pins 40 to freely enter and exit from the ends of the slot as the belt moves across the upper surface of plate 34. The pins extend into the slot and prevent lateral translation of the moving belt.

To facilitate movement of the belt across the manifold, the upper surface of top plate 34 of the manifold is covered with a material having a low coefficient of friction, such as graphite impregnated nylon. As belt illustrated in Fig. 3, the embodiment described includes lining members 42 secured on each side of the upper surface of plate 34. The lining members are of generally U-shaped cross section having a bottom lip 43 adapted to engage the bottom surface of plate 34. The lining members can be fabricated of nylon or some other suitable material and are bonded or otherwise secured to the plate.

Belt 11 is fabricated of reinforced rubber or other conventional material and includes perforations 41 therein, spaced in line along the belt adapted to successively register with slot 38. Interspersed with the perforations, and in alignment therewith, are pins 40, previously mentioned. In the embodiment illustrated, particularly in FIG. 5, belt 11 is shown comprised of an upper layer 45 and a lower layer 46 laminated together. Each pin 40 is formed with a body portion 48 adapted to extend through a suitable opening 49 in the bottom layer of the belt, and has a head portion 50 which retains the pin in position between laminated layers 45, 46 of the belt.

It should be recognized that the invention is not limited to the pin and belt configuration illustrated in FIG. 5. Rather, any suitable means of securing pins or guides on the bottom of a belt could be utilized. Furthermore, the use of a laminated belt is not required.

The vacuum conveyor beam described is designed for use singly or in multiple sets to transport objects from one location to another or to retain objects such as panels in accurate registration while transporting them past working elements. Accordingly, the framework 18 of each beam can be supported on legs, not shown, or can be otherwise supported in gang fashion by suitable means.

In using the beam, an object such as a panel is placed on the moving belt. With perforations 41 in the belt covered and a vacuum within manifold 19, a force is exerted on the top of the panel which firmly grasps the panel against the belt. Desired operations can then be performed upon the workpiece. For example, in the case of a panel, grooving or sanding operations can be performed upon the upper surface of the panel. The panel is retained in alignment with the path of movement of the belt even though significant side thrusts or lateral forces are exerted upon the panel during the grooving or sanding operations. This eliminates the necessity of providing a reference surface at the edge of the panel. Furthermore, it eliminates the need to finish panels or other blanks to a true lateral dimension before the sanding or grooving operations are performed.

It should be apparent that the slot 38 performs a dual purpose of communicating with perforations 41 and serving as a guide slot for pins 40. While the intermittent entry of pins into the ends of the slot creates a pressure loss, this loss is not significant in view of the pressure being maintained on the workpiece. However, if desired, suitable seals can be provided at the ends of slot 38.

It is claimed and desired to secure by Letters Patent:

1. A vacuum conveyor beam comprising
    a vacuum manifold adapted to be evacuated, having an upper plate with an elongate slot formed therein;
    an endless belt supported over said slot, said belt having a line of perforations formed therein adapted to register with said slot,
    a plurality of guide pins extending from an inner surface of said belt, interspersed with said perforations,
    means engaging the belt for driving said belt across said upper plate with said pins extending into said slot, said slot having end portions permitting said pins to enter and leave said slot.

2. A conveyor beam ad described in claim 1 wherein the opposed sides of said slot are each covered by a nylon lining of generally U-shaped cross section having an upper lip adapted to at least partially cover said upper plate, and a lower lip adapted to engage the bottom surface of said upper plate.

3. A vacuum conveyor beam comprising an elongate framework having a drive pulley suspended at one end and an idler pulley suspended at the other end,
    a vacuum manifold, adapted to be evacuated, confined within said framework having an upper plate formed with an elongate slot therein defining opposed straight edges,
    an endless conveyor belt supported at its ends by said pulleys and having an upper reach supported on said upper plate over said slot, said belt having a line of perforations therein in registration with said slot,
    a plurality of guide pins extending from the inner surface of said belt interspersed with said perforations, said drive pulley adapted to engage the inner surface of said belt for driving the belt across the upper plate with the pins extending into the slot to prevent side thrusting of said belt and to maintain registration between said slot and the perforations in the belt, said slot having end portions permitting said pins to enter and leave said slot.

4. A conveyor beam as described in claim 3 further including nylon linings secured to the opposed edges of said slot, each of said linings having a generally U-shaped cross section and including an upper lip adapted to at least partially cover said upper plate, and a lower lip adapted to engage the bottom surface of said plate.

* * * * *